July 11, 1950 C. C. LAURITSEN 2,515,048
MULTIPLE ROCKET MOTOR
Filed April 2, 1943 2 Sheets-Sheet 1
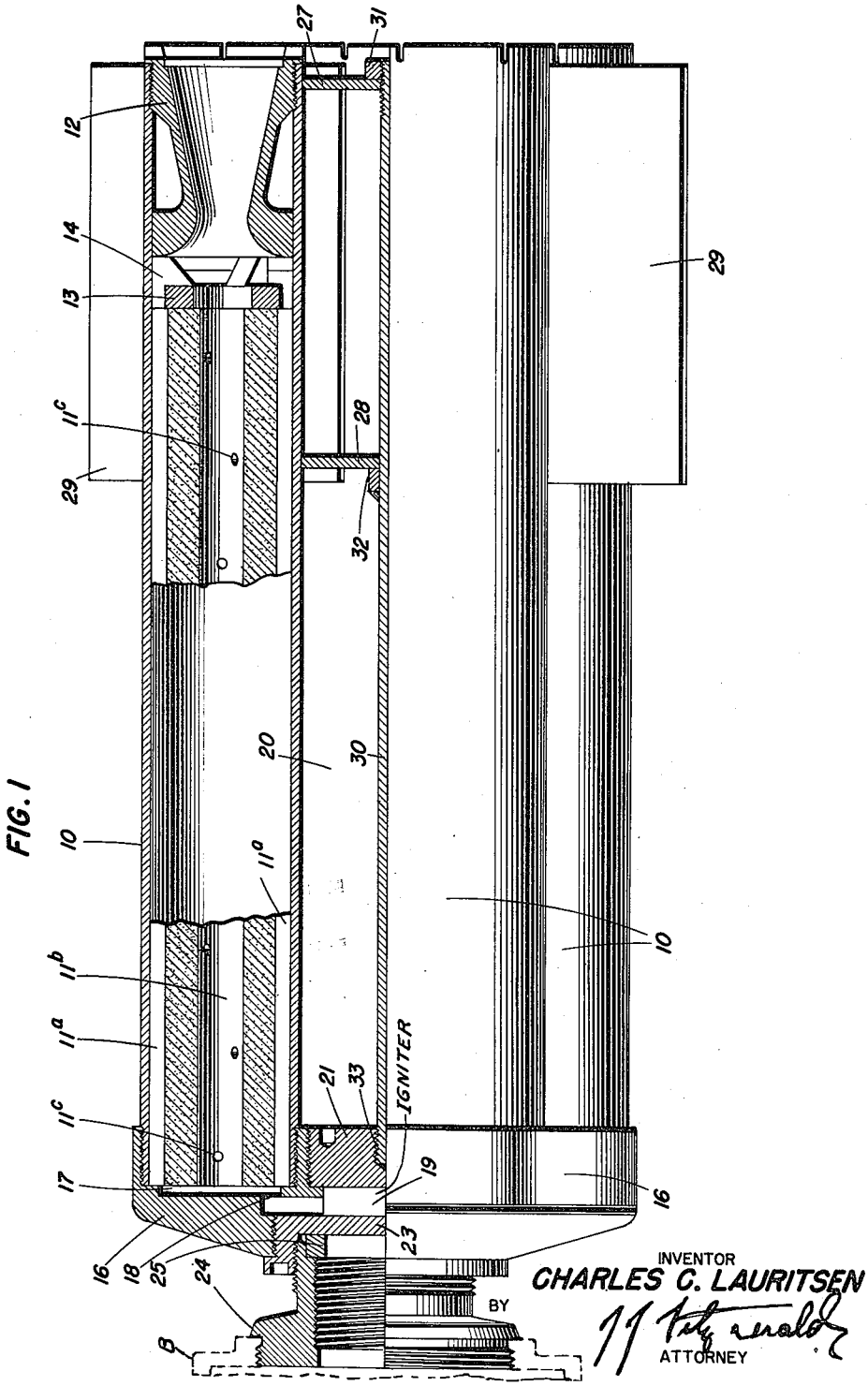
FIG. I
INVENTOR
CHARLES C. LAURITSEN
BY
ATTORNEY July 11, 1950

C. C. LAURITSEN 2,515,048

MULTIPLE ROCKET MOTOR

Filed April 2, 1943

INVENTOR
CHARLES C. LAURITSEN
BY
ATTORNEY

Patented July 11, 1950

2,515,048

UNITED STATES PATENT OFFICE 2,515,048

MULTIPLE ROCKET MOTOR

Charles C. Lauritsen, Pasadena, Calif., assignor to the United States of America as represented by the Secretary of the Navy Application April 2, 1943, Serial No. 481,651

8 Claims. (Cl. 102—49)

This invention relates to rocket motors and more particularly to a multiple rocket motor of novel construction comprising a plurality of rocket bodies disposed in parallel relation and having a common head from which the propellent charges are ignited.

Rocket motors as commonly made include a hollow rocket body containing a propellent charge and an igniter for initiating combustion of the charge, the products of combustion being discharged through a nozzle in the rear end of the body. A motor of this type is disclosed in a copending application of C. C. Lauritsen, Ser. No. 481,644, filed April 2, 1943, now Patent No. 2,464,181, issued March 8, 1949. These rocket motors have been made in several standard sizes each having a predetermined propelling capacity. For some purposes, however, it is desirable to employ a motor having a greater capacity than the available standard motors, and heretofore the provision of such a motor has generally required the use of a new motor design.

One object of the present invention, therefore, is to provide a novel rocket motor including a plurality of standard rocket bodies nested together in a single unit, whereby the propelling capacity of the unit is approximately a multiple of the capacity of each component rocket.

Another object of the invention resides in the provision of a motor of the character described in which the front end of each rocket body is mounted in a common head for connecting the component rockets, and in which the head has a single ignition chamber communicating with the several rocket bodies for igniting the charges therein.

Still another object of the invention is to provide a multiple rocket motor of novel construction having a removable fin assembly for rendering the motor more stable in flight, the fin assembly being held in position by the several component rockets.

A further object of the invention is in the provision of a multiple rocket motor having a common safety valve for the several component rockets so that the development of excessive pressures therein is prevented.

For a better understanding of the invention, reference may be had to the accompanying drawings in conjunction with the following detailed description.

In the drawings:

Fig. 1 is a side view, partly in section, of one form of the new motor;

Figure 2:
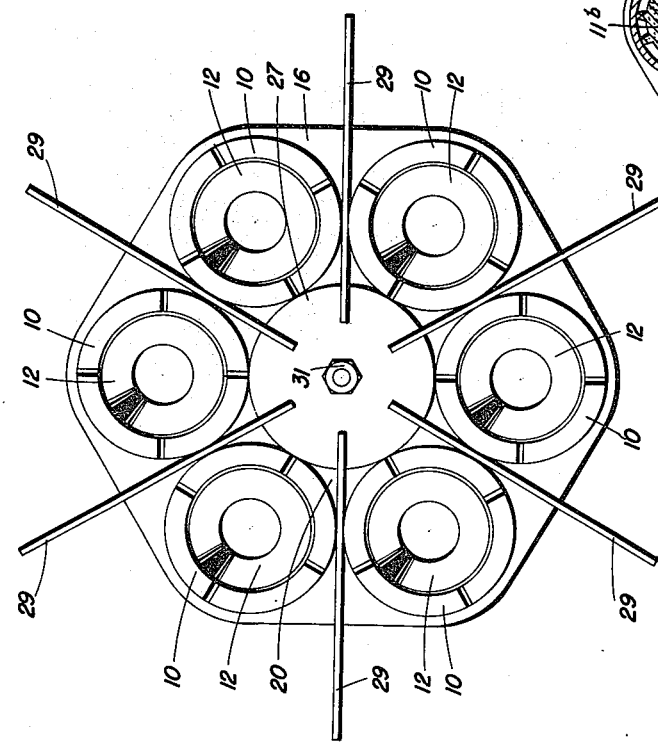
Fig. 2 is a rear end view of the motor shown in Fig. 1.

Referring to Figs. 1 and 2, the device there shown comprises a plurality of rocket motors 10 disposed in a unit in annular parallel adjacent relation. Each of the motors 10 is preferably of the general form disclosed in the above identified copending application of C. C. Lauritsen. More particularly, each motor 10 comprises a hollow cylindrical body, which may be made of seamless steel tubing, containing a generally cylindrical grain of powder, such as Ballistite. On its outer cylindrical surface, the grain has longitudinal ribs 11a which fit closely against the inner wall of the cylindrical rocket body 10, whereby external combustion spaces are provided between the ribs. An axial passage 11b extends through the grain and forms an internal combustion space which communicates through radial openings 11c with the external combustion spaces between the ribs. Threaded in the rear end of each rocket body 10 is a discharge nozzle 12, and between the nozzle and the rear end of the grain 11 is a supporting grid comprising a ring 13 connected to the grain and having radial legs 14 engaging the inner wall of the rocket body.

At their front ends, the rocket bodies 10 are threaded in a head 16 having recesses 17 in front of the bodies. The recesses 17 communicate through radial passages 18 with a common ignition chamber for receiving an igniter 19. The igniter 19 may be of any desired type but is preferably operable electrically through suitable wiring from a current source (not shown).

The rocket bodies 10 may vary in number, but for illustrative purposes I have shown six rocket bodies. The bodies 10 are disposed in symmetrical, closely spaced relation around the peripheral portion of the head 16, so that the bodies define an axial passage 20 which is alined with the central igniter 19 and extends through the rear end of the multiple motor. A plug 21 is screwed in the head 16 to block the ignition chamber from the axial passage 20.

Threaded in the front end of the head 16 is a cup-shaped adaptor 23, the closed end of which forms the outer wall of the ignition chamber. The adaptor 23 is internally threaded for receiving a connector element 24 by which the motor may be connected to a pay load, such as a bomb or equivalent projectable missile fragmentarily indicated at B, Fig. 1. The connector element 24 is screwed into the adaptor 23 against a ring 25.

In the rear end portion of the axial passage 20 is a hub comprising a pair of spaced discs 27 and 28 which are slotted to receive a plurality of stabilizing fins 29 projecting radially through the spaces between the adjacent rocket bodies 10. The fins are connected to the hub discs 27 and 28 in any suitable manner, as by welding. A rod 30 extends through central openings in the hub discs 27 and 28 and through the axial passage 20 to the plug 21, the front end of the rod being threaded at 33 in the plug. A nut 31 is screwed on the rod against disc 27, and the disc 28 is seated against a stop 32 on the rod. By unscrewing the nut 31, the hub discs 27 and 28 and the fins 29 may be removed as a unit from the motor by sliding the members to the rear and thereby disengaging the fins and the hub discs from the rocket bodies 10.

In operation, when the igniter 19 is fired, the blast is communicated through the radial passages 18 and recesses 17 to the interior of the rocket bodies 10. Since the external combustion surfaces between the ribs 11a and the internal combustion surface defining passage 11b communicate with the recesses 17, combustion of the powder grains is initiated simultaneously on their internal and external surfaces. The products of combustion in the several rocket bodies are then discharged under high pressure through the nozzles, and the motor is driven by the combined propulsion effects of the rockets. By arranging the rocket bodies on the head 16 in symmetrical relation about a common axis through the passage 20, yawing of the motor in flight is substantially prevented. The fins 29 serve to increase the flight stability of the motor.

Figure 3:
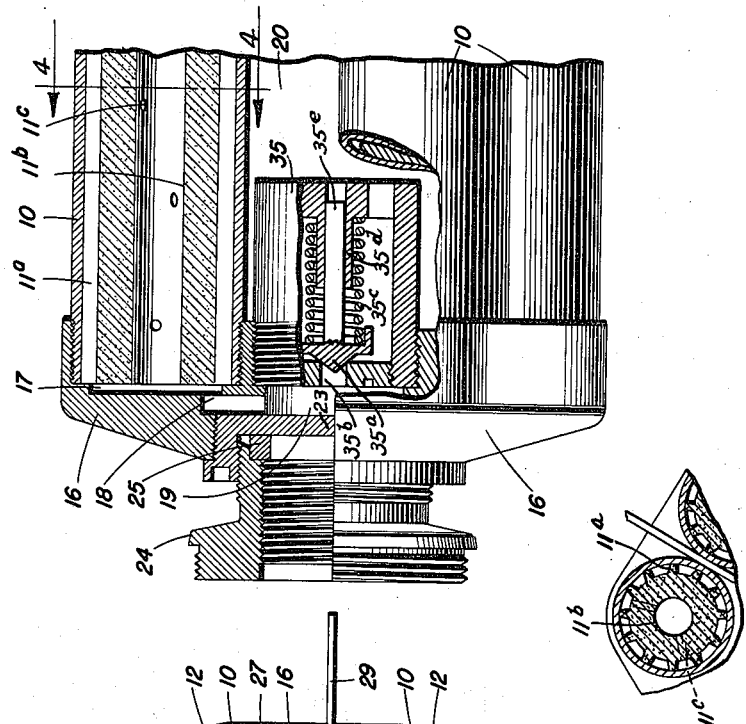
Fig. 3 is a side view, partly in section, showing part of a modified form of the motor.
Figure 4:
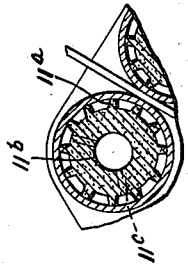
Fig. 4 is a fragment of a cross-sectional view of the motor, taken along line 4—4 of Fig. 3.

The multiple rocket motor shown in Fig. 3 is similar to that illustrated in Figs. 1 and 2 except that the fin assembly, the rod 30 and the plug 21 are omitted, and a safety valve 35 is inserted in place of the plug. The valve may be of any desired form which is adapted to open under a predetermined operating pressure in the ignition chamber, the valve discharging into the axial passage 20. A typical valve includes a valve member 35a which is initially seated against the inner edge of an opening 35b, to which the igniter 19 has access, by a spring 35c. The ends of the spring abut the valve member and the perforated end of the valve casing, in a portion 35d of which the stem 35e is guided. The pressure at which the valve operates corresponds to the maximum safe pressure in the rocket bodies 10. Thus, during combustion of the propellent charges, if the pressure in the rocket bodies should become too great, it acts through passages 18 and the ignition chamber to open the safety valve so that the pressure is relieved.

I claim:

1. A rocket motor comprising a plurality of rocket bodies disposed in parallel adjacent relation, a common head on the front ends of the rocket bodies for connecting said bodies, and an assembly of stabilizing fins mounted on the rear end portions of the bodies, each of said fins comprising a plane, unbent plate occupying radial position between said rocket bodies.

2. A rocket motor comprising a plurality of rocket bodies disposed in parallel adjacent relation and defining an axial passage in the motor, a common head connected to the front ends of the bodies, a hub in said passage, and plane, unbent stabilizing fins projecting radially from the hub through spaces between said bodies.

3. A rocket motor comprising a plurality of rocket bodies disposed in parallel adjacent relation and defining an axial passage in the motor, a common head connected to the front ends of the bodies, a fin assembly including a hub in said passage and fins projecting radially from the hub through spaces between said bodies, and means in the passage connected to said head for locking the fin assembly in the passage.

4. A rocket motor comprising a plurality of rocket bodies disposed in parallel adjacent relation and defining an axial passage in the motor, a common head connected to the front ends of the rocket bodies and having a central chamber communicating with the interiors of said bodies, and a safety valve mounted in the head between said chamber and the axial passage for limiting the pressure in said bodies.

5. A rocket motor comprising a plurality of rocket bodies disposed in parallel adjacent relation and defining an axial passage in the motor, a common head connected to the front ends of the rocket bodies and having a central ignition chamber and radial passages for connecting the chamber to the interiors of said bodies, and a safety valve mounted in the head between said chamber and the axial passage for limiting the pressure in said bodies.

6. A rocket motor comprising a plurality of rocket bodies disposed in parallel adjacent relation, a common head on the front end of said rocket bodies for connecting said bodies, and a removable assembly of stabilizing fins mounted on the rear end portions of the bodies and being supported by said bodies, each of said fins of said assembly comprising a plane, unbent plate extending radially between said bodies and being supported by said bodies.

7. A rocket motor comprising a plurality of rocket bodies disposed in parallel adjacent relation and defining an axial passage in the motor, a common head connected to the front ends of said bodies, a rod passing axially through said axial passage in removable engagement with said common head, and a fin assembly removably mounted on said rod, said fin assembly being disposed within a portion of said axial passage and being supported by said rocket bodies.

8. The combination of a projectable missile, a multiple rocket motor for propelling the missile, said motor consisting of a plurality of rocket bodies each with an aft constricted opening forming a nozzle-orifice, a head to which the fore ends of the rocket bodies are attached in an annular group, said head having an ignition chamber communicating with all of the rocket bodies at their fore ends, and a connector element by which the motor is coupled to the missile so that the missile and motor axes coincide.

CHARLES C. LAURITSEN.

REFERENCES CITED

The following references are of record in the file of this patent:

UNITED STATES PATENTS

| Number | Name | Date |
|---|---|---|
| 327,380 | Chambers | Sept. 29, 1885 |
| 457,383 | Sprague | Aug. 11, 1891 |
| 2,062,495 | Brayton | Dec. 1, 1936 |

FOREIGN PATENTS

| Number | Country | Date |
|---|---|---|
| 347 | Great Britain | Jan. 26, 1878 |
| 395,709 | France | Jan. 5, 1909 |
| 129,701 | Great Britain | July 24, 1919 |
| 157,714 | Great Britain | Mar. 16, 1922 |
| 516,865 | Great Britain | Jan. 12, 1940 |